United States Patent
Kupper et al.

(10) Patent No.: US 6,406,029 B1
(45) Date of Patent: Jun. 18, 2002

(54) SEAL ASSEMBLY HAVING AN ENCAPSULATED CONE SPRING

(75) Inventors: David G. Kupper, Edelstein; Jerry A. Metz, Morton, both of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/375,888

(22) Filed: Aug. 17, 1999

(51) Int. Cl.[7] .................................. F16J 15/32
(52) U.S. Cl. .................. 277/383; 277/554; 277/573; 305/104
(58) Field of Search .................. 277/375, 381, 277/383, 384, 394, 397, 554, 573, 572, 555; 305/102–6

(56) References Cited

U.S. PATENT DOCUMENTS

| | | | | |
|---|---|---|---|---|
| 3,096,835 A | * | 7/1963 | Neilson | 384/94 |
| 3,137,508 A | * | 6/1964 | Cunningham | 277/383 |
| 3,199,878 A | * | 8/1965 | Cunningham et al. | 277/322 |
| 3,313,552 A | * | 4/1967 | McElya et al. | 277/384 |
| 3,370,895 A | * | 2/1968 | Cason, Jr. | 384/94 |
| 3,381,968 A | * | 5/1968 | Neilson | 277/383 |
| 3,489,421 A | * | 1/1970 | Neilson | 277/383 |
| 3,614,113 A | * | 10/1971 | Burk | |
| 4,058,322 A | * | 11/1977 | Fass | |
| 4,179,130 A | * | 12/1979 | Fass et al. | |
| 4,392,657 A | | 7/1983 | Roley | 277/95 |
| 4,582,366 A | * | 4/1986 | Burfield | 305/11 |
| 4,722,404 A | * | 2/1988 | Evans | 175/371 |
| 4,822,057 A | * | 4/1989 | Chia et al. | 277/383 |
| 5,772,217 A | * | 6/1998 | Poll | 277/383 |

* cited by examiner

*Primary Examiner*—Anthony Knight
*Assistant Examiner*—Alison K. Pickard
(74) *Attorney, Agent, or Firm*—Robert A. McFall; Robert J. Hampsch

(57) ABSTRACT

A seal ring having a frustoconical spring completely encapsulated within an annular body provides a bias force to an annular lip seal of the annular body to assure positive contact with an opposed face of an adjacently disposed member of a joint assembly. The seal ring requires minimal counterbore depth in the member in which the seal ring is mounted, and no modifications are required in the spring or in the base of the counterbore to provide retention of the spring in the joint.

11 Claims, 2 Drawing Sheets

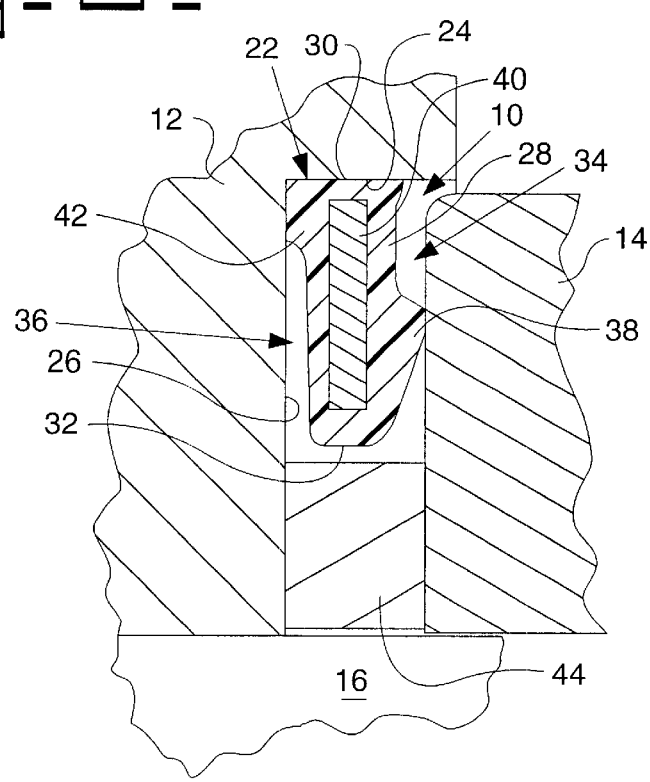
Fig-2-
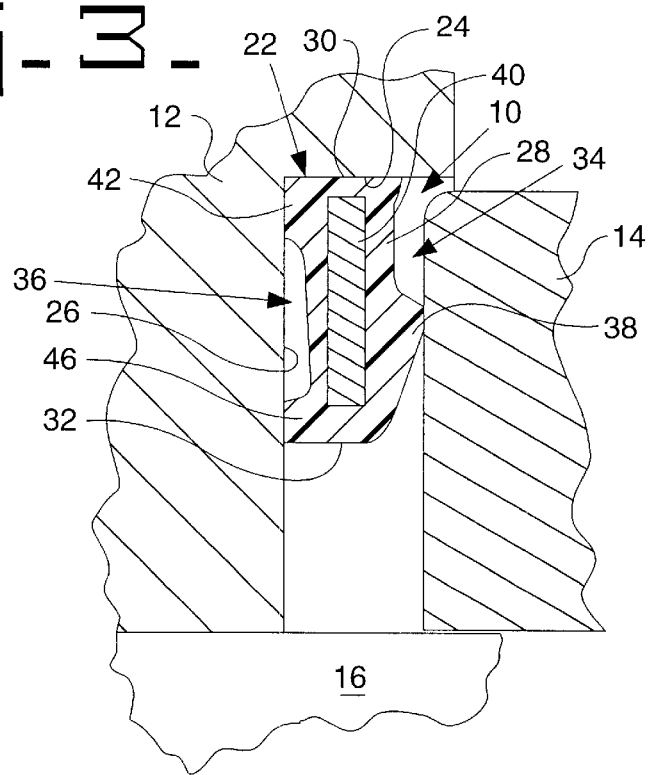
Fig-3-

SEAL ASSEMBLY HAVING AN ENCAPSULATED CONE SPRING

TECHNICAL FIELD

This invention relates generally to a seal ring, and more particularly to a seal ring having a cone spring encapsulated within the seal ring.

BACKGROUND ART

Various seals have been developed for use in sealing a variable space between two relatively rotatable members. A joint in which movement of this type occurs is that found in the track structure of a track-type vehicle such as a tractor or the like. For example, U.S. Pat. No. 4,392,657, issued Jul. 12, 1983, to Robert D. Roley, titled Belleville Spring Loaded Seal and assigned to the assignee of the present invention, describes a seal structure having a Belleville spring which urges the sealing component of the structure having a Belleville spring which urges the sealing component of the structure into sealing engagement with an opposed face of the joint assembly. In the Roley seal structure, the Belleville spring is disposed within;the actual sealing element of the assembly and is modified by a plurality of annularly arranged openings extending through the spring itself. The sealing element, containing the Belleville spring, is attached to one end of a support spring which has an opposite end pressed into an annular groove formed in the radial wall of a counterbore in which the seal assembly is positioned. The seal assembly described by Roley requires a relatively deep counterbore to support the sealing element, which uses a cantilevered spring to support the Belleville spring, in addition to requiring a deep groove machined into the flat radial face of the counterbore to support the anchored end of the cantilevered spring.

The present invention is directed to overcoming the problems set forth above. It is desirable to have a seal ring in which a Belleville spring advantageously provides improved sealing performances a result of a cone, or Belleville, spring encased in the seal ring. The cone spring applies a consistent load to a sealing element of the seal ring. It is also desirable to have a seal assembly which only requires a relatively shallow counterbore, thereby allowing more engagement area between the member in which the counterbore is formed and a pin pressed into the bore of the member. It is also desirable to have such a seal assembly that does not require mounting by an annular cantilevered spring that must be retained within an additionally formed groove in the base of the counterbore.

The present invention is directed to a seal assembly having a unitary structure.

DISCLOSURE OF THE INVENTION

In accordance with one aspect of the present invention, an annular seal ring for sealing a joint between firsthand second members that are coaxially mounted on an elongated cylindrical member, are rotatably movable with respect to each other about a longitudinal axis of the elongated cylindrical member and have a variable space between axially opposed radial faces of the first and second members. A radial face of a preselected one of the first and second members has a counterbore defined by a cylindrical circumferential wall and a recessed radial wall extending radially inwardly from the cylindrical circumferential wall. The annular seal ring embodying the present invention is positionable within the counterbore and includes an annular body having a radially outer cylindrical wall adapted to be received, and positioned in forced abutment with, the cylindrical circumferential wall of the counterbore. The annular body also has a radially inner cylindrical wall, axially spaced apart front and rear surfaces, and an annular lip projecting outwardly from the front surface of the annular body. The annular seal ring also includes an annular frustoconical spring that is axially aligned with the annular lip disposed on the front surface of the body, and is completely encapsulated within the annular body at a position between the annular lip and the real surface of the body.

Another feature of the annular seal ring embodying the present invention includes the rear surface of the annular body having a seating surface extending outwardly from the rear surface at a position adjacent the radially outer cylindrical wall of the annular body for a distance sufficient to abut the recessed radial wall of the counterbore when the annular seal ring is assembled in the joint.

Yet another feature of the annular seal ring embodying the present invention includes the annular body having a thrust load-resisting surface extending axially outwardly from the rear surface of the annular body at a position adjacent the inner cylindrical wall of the annular body for a distance sufficient to abut the recessed radial wall of the counterbore when the annular seal ring is assembled in the joint.

Still other features of the annular seal ring embodying the present invention include the annular body being formed of a polymeric material, the annular body being formed of a material having a Shore D hardness from about 45 to about 55, and the annular frustoconical ring being insert molded in the annular body.

BRIEF DESCRIPTION OF THE DRAWINGS

A more complete understanding of the structure and operation of the present invention may be had by reference to the following detailed description when taken in conjunction with the accompanying drawings, wherein:

FIG. 2 is a fragmentary enlarged section of a first embodiment of the seal ring embodying the present invention; and FIG. 3 is a fragmentary enlarged section of a second embodiment of the seal ring embodying the present invention.

BEST MODE FOR CARRYING OUT THE INVENTION

Figure 1:
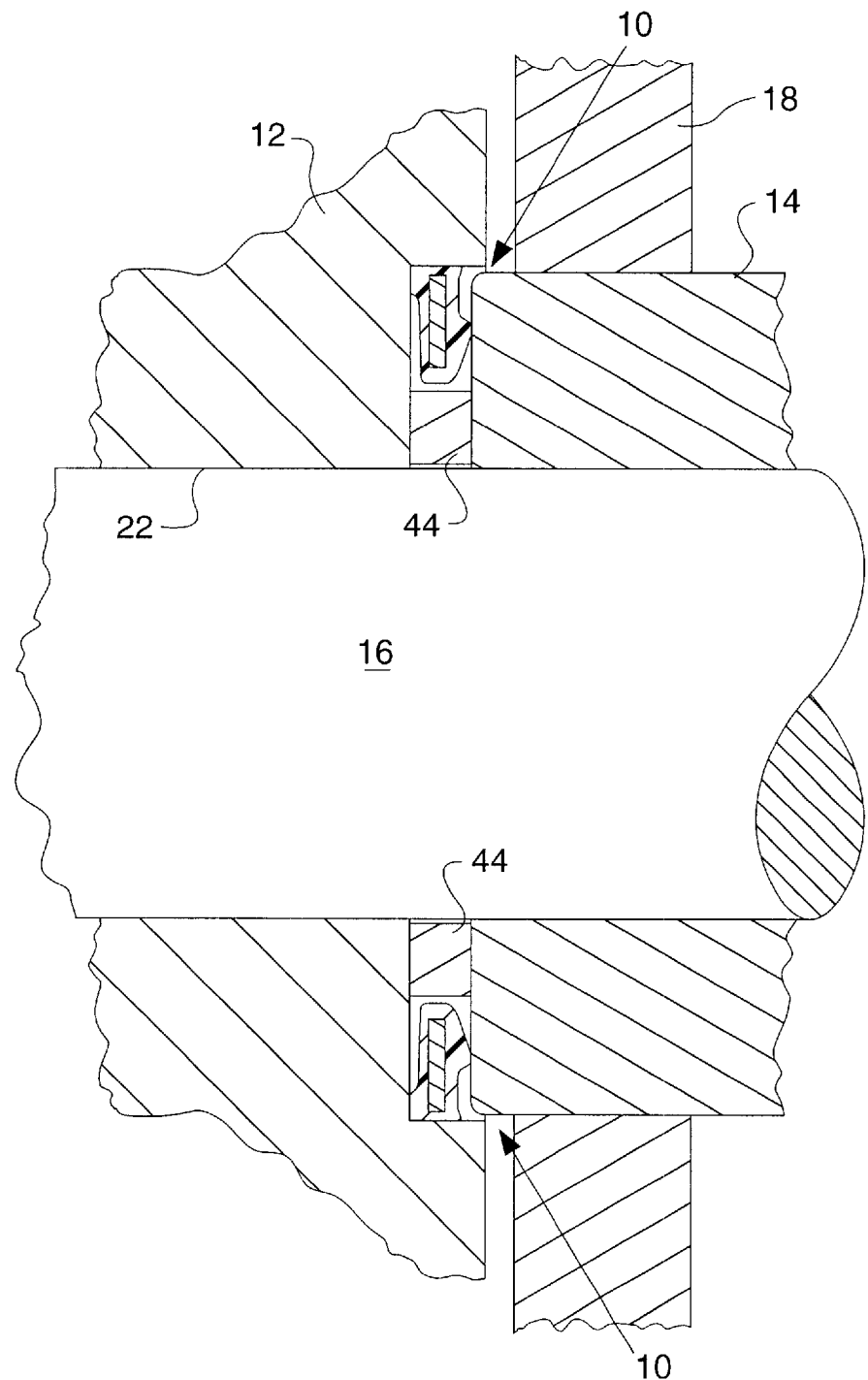
FIG. 1 is a fragmentary diametric section of a track pin joint having a seal ring embodying the present invention disposed therein.

An illustrated embodiment of a seal ring embodying the present invention is generally designated by the reference numeral 10 in the drawings. The seal assembly 10 is advantageously used to seal the variable space between a first joint member 12 and a second joint member 14, which have relative movement toward and from each other so as to have variable spacing therebetween during operation. In the illustrated embodiment, the first joint member 12 comprises a portion of a first track link, and the second joint member 14 comprises a bushing that is rotatably mounted on a track pin 16 and is received in a portion of a second track link 18. The track pin 16 is pressed into a bore 22 of the first track link 12, thereby prohibiting relative movement between the first track link 12 and the track pin 16. The first joint member 12 further has a counterbore defined by a cylindrical circumferential wall 24 and a recessed radial wall 26 extending radially inwardly from the cylindrical circumferential wall 24.

The seal ring 10 has an annular body 28 which has a radially outer circumferential wall 30 that is adapted to be received within the cylindrical circumferential wall 24 of the counterbore 22, in forced abutment with the cylindrical circumferential wall 24. The radially outer circumferential wall 30 of the annular body 28 has a diameter slightly greater than the diameter of the cylindrical circumferential wall 24 of the counterbore 22 so that the respective circumferential walls 24, 30 forcedly abut each other as a result of the interference fit between the respective walls. In an illustrative example of a typical suitable interference fit, the cylindrical circumferential wall 24 of the counterbore has a diameter of 59.4 mm and the outer circumferential wall of the annular body 28 has a diameter of 60.9 mm, resulting in a radial interference of about 0.75 mm between the outer cylindrical wall 30 of the annular body 28 and the cylindrical circumferential wall 24 of the counterbore 22. This assures tight retention of the seal ring 10 within the counterbore 22 of the first joint member 12.

The annular body 28 of the annular seal ring 10 also has a radially inner cylindrical wall 32, a front surface 34, a rear surface 36 axially spaced from the front surface 34, and an annular lip seal 38 projecting outwardly from the front surface 34 of the annular body 28.

The annular body 28 is desirably formed of a polymeric material such as an injection-moldable polyurethane. Also, to provide a desirable combination of sealing elasticity and structural strength, the injection moldable material from which the annular body 28 is formed desirably has a Shore D hardness of from about 45 to about 55.

The annular seal ring 10 embodying the present invention also has an annular frustoconical spring 40 that is encapsulated, preferably by insert molding, within the annular body 28. The annular frustoconical spring 40 is axially aligned with the annular lip seal 38 at a position between the annular lip seal 38 land the rear surface 36 of the body 28. The frustoconical spring 40, also commonly referred to as a cone spring, cone washer, conical spring or Belleville spring, is insert molded within the annular body 28 in its free state, and is urged into a compressed state by assembly of the joint. Frustoconical springs occupy a very small axial space and are stressed, when compressed, in a manner such that they provide unusually high spring rates. The frustoconical spring 40 provides a bias force that is transmitted through the annular body 28 to the annular lip seal 38 to maintain the lip seal 38 in biased contact with the opposed face of the second joint member 14.

In a first embodiment of a seal assembly 10, the rear surface 36 of the annular body 28 has a seating surface 42 extending outwardly from the rear surface 36 at a position adjacent the radially outer cylindrical wall 30 of the annular body 28. The seating surface 42 is spaced from the rear surface 36 at a distance sufficient to abut the recessed radial wall 26 of the counterbore 22 when the annular seal ring 10 is assembled in the joint. In this first embodiment, the joint preferably also includes a separate thrust ring 44 which is disposed between the first joint member 12 and the second joint member 14 to limit movement of the two members 12, 14 toward each other.

In a second embodiment of the present invention, the annular seal ring 10 has an integrally formed thrust load-resisting surface 46 that extends outwardly from the rear surface 36 of the annular body 28 at a position adjacent the inner cylindrical wall 32 of the body 28. The integrally formed thrust load-resisting surface 46 is spaced from the rear surface 36 at a distance sufficient to abut the recessed radial wall 26 of the counterbore 22 when the annular seal ring 10 is assembled in the joint. In this embodiment, the thrust load-resisting surface 46 serves as a thrust ring, thereby eliminating the need for a separate thrust ring in the joint assembly.

Industrial Applicability

The seal ring 10 embodying the present invention provides an improved seal for variably spaced joint members, such as found in track joints. The frustoconical spring 40 encapsulated within the annular body 28, provides a bias force that urges the annular lip seal 38 axially outwardly away from the counterbore of the first joint member 12 and into biased contact with the radial face of the second joint member 14, thereby assuring positive, continually biased, abutment of the resilient lip seal 38 with the opposed face of the second joint member 14 during movement of the joint.

The seal member 10 provides improved sealing performance due to the consistent load provided by the frustoconical spring 40. Also, pin retention capability of the link assembly is improved due to the reduced requirement for a deep counterbore in the joint member that nonrotatably receives the common mounting pin. Thus, pin retention capability of the first joint member 12 is improved due to the requirement for reduced counterbore depth. Advantageously, the reduction in counterbore depth allows more pin engagement surface area with the link 12.

Although the present invention is described in terms of an illustrated exemplary embodiment, with specific illustrative constructions related to a track pin joint, those skilled in the art will recognize that application of the annular seal ring embodying the present invention in other joint arrangements and constructions may be made without departing from the spirit of the invention. Such changes are intended to fall within the scope of the following claims. Other aspects, features, and advantages of the present invention may be obtained from a study of this disclosure and the drawings, along with the appended claims.

What is claimed is:

1. An annular seal ring for sealing a joint between first and second members, the annular seal ring comprising:
   an annular body having a radially outer cylindrical wall, a radially inner cylindrical wall, axially spaced apart front and rear surfaces, an annular lip seal projecting outwardly from the front surface at a location generally midway between the radially outer cylindrical wall and the radially inner cylindrical wall, and a seating segment projecting from the rear surface; and
   an annular spring completely encapsulated within the annular body and disposed at a position between the lip seal and the rear surface of the annular body.

2. The annular seal ring of claim 1 further comprising a thrust resisting segment projecting from the rear surface and spaced apart from the seating segment.

3. The annular seal ring of claim 2 wherein the thrust resisting segment is disposed on the rear surface at a location proximate the radially inner cylindrical wall.

4. The annular seal ring of claim 1 wherein the annular spring is a frustoconical spring.

5. The annular seal ring of claim 1 wherein the annular spring extends from a position proximate the radially outer cylindrical wall to a position proximate the radially inner cylindrical wall.

6. An annular seal assembly comprising:
   first and second members coaxially mounted in a juxtapose orientation on an elongated cylindrical member having a longitudinal axis, the first and second members being rotatably movable with respect to each other about the longitudinal axis, the first member having a counterbore defined therein;

an annular seal ring being interposed between the first and second members and disposed within the counterbore;

the seal ring comprising an annular body having a radially outer cylindrical wall, a radially inner cylindrical wall, axially spaced apart front and rear surfaces, a seating segment projecting from the rear surface in sealing contact with the first member and an annular lip seal projecting outwardly from the front surface at a location generally midway between the radially outer cylindrical wall and the radially inner cylindrical wall and in sealing contact with the second member; and an annular spring axially aligned with the annular lip seal and completely encapsulated within the annular body, the annular spring disposed at a position between the annular lip seal and the rear surface of the body.

7. The annular seal ring of claim 6 further comprising a thrust resisting segment projecting from the rear surface and spaced, apart from the seating segment.

8. The annular seal ring of claim 7 wherein the thrust resisting segment is disposed on the rear surface at a location proximate the radially inner cylindrical wall.

9. The annular seal ring of claim 6 wherein the annular spring is a frustoconical spring.

10. The annular seal ring, as set forth in claim 6 6 wherein the annular body of the annular seal ring is formed of a polymeric material.

11. The annular seal ring, as set forth in claim 6 wherein the annular body of the annular seal ring is formed of material having a Shore D hardness of from about 45 to about 55.

\* \* \* \* \*